(12) United States Patent
Zhang

(10) Patent No.: US 10,415,564 B2
(45) Date of Patent: Sep. 17, 2019

(54) VALVE CLACK AND AIR PUMP HAVING SAME

(71) Applicant: XIAMEN KOGE MICRO TECH CO., LTD., Xiamen (CN)

(72) Inventor: Kunlin Zhang, New Taipei (TW)

(73) Assignee: XIAMEN KOGE MICRO TECH CO., LTD., Xiamen (CN)

(*) Notice: Subject to any disclaimer, the term of this patent is extended or adjusted under 35 U.S.C. 154(b) by 573 days.

(21) Appl. No.: 15/031,909

(22) PCT Filed: Oct. 24, 2014

(86) PCT No.: PCT/CN2014/089475
§ 371 (c)(1),
(2) Date: Apr. 25, 2016

(87) PCT Pub. No.: WO2015/058717
PCT Pub. Date: Apr. 30, 2015

(65) Prior Publication Data
US 2016/0265525 A1 Sep. 15, 2016

(30) Foreign Application Priority Data

Oct. 25, 2013 (CN) .......................... 2013 1 0512092
Oct. 25, 2013 (CN) .......................... 2013 1 0512134
(Continued)

(51) Int. Cl.
*F04B 53/10* (2006.01)
*F04B 43/00* (2006.01)
(Continued)

(52) U.S. Cl.
CPC ...... *F04B 53/1065* (2013.01); *F04B 27/1009* (2013.01); *F04B 39/1073* (2013.01);
(Continued)

(58) Field of Classification Search
CPC ................ F04B 53/1065; F04B 53/106; F04B 53/1042; F04B 53/1055; F04B 53/1037;
(Continued)

(56) References Cited

U.S. PATENT DOCUMENTS 3,819,306 A 6/1974 Russell
4,428,392 A * 1/1984 Jones .................. A61M 16/208
128/205.24
(Continued)

FOREIGN PATENT DOCUMENTS

CN 2366585 Y 3/2000
CN 1428511 A 7/2003
(Continued)

OTHER PUBLICATIONS

Translation of the International Search Report and Written Opinion corresponding to International Patent Application No. PCT/CN2014/089475, dated Jan. 28, 2015, 10 pages.
(Continued)

*Primary Examiner* — Christopher S Bobish
(74) *Attorney, Agent, or Firm* — Lathrop Gage LLP

(57) ABSTRACT

A valve clack is provided. The valve clack includes: a mounting column (11) having a plurality of air slots (111) for dispersing an airflow at least in a top surface of the mounting column (11); a plurality of blades (12) arranged outside the mounting column (11) in a circumferential direction of the mounting column (11), each blade (12) having a radial inner end connected to the mounting column (11) and elastically swingable with respect to the mounting column (11).

17 Claims, 9 Drawing Sheets

(30) Foreign Application Priority Data

Oct. 25, 2013 (CN) .......................... 2013 1 0514092
Sep. 28, 2014 (CN) .................... 2014 2 0565479 U

(51) Int. Cl.
*F04B 27/10* (2006.01)
*F04B 43/02* (2006.01)
*F16K 15/14* (2006.01)
*F04B 39/10* (2006.01)
*F04B 45/04* (2006.01)

(52) U.S. Cl.
CPC ........ *F04B 43/0045* (2013.01); *F04B 43/026* (2013.01); *F04B 45/04* (2013.01); *F04B 45/043* (2013.01); *F04B 53/106* (2013.01); *F04B 53/1037* (2013.01); *F04B 53/1042* (2013.01); *F04B 53/1055* (2013.01); *F16K 15/148* (2013.01); *Y10T 137/784* (2015.04); *Y10T 137/789* (2015.04)

(58) Field of Classification Search
CPC .............. F04B 27/1009; F04B 43/0045; F04B 43/026; F04B 45/043; F16K 15/148; Y10T 137/789; Y10T 137/784
USPC .................................................... 137/512.15
See application file for complete search history.

(56) References Cited

U.S. PATENT DOCUMENTS

| | | | |
|---|---|---|---|
| 5,203,831 A * | 4/1993 | Lind .......................... | B63C 9/24 137/1 |
| 6,840,745 B1 * | 1/2005 | Macauley .............. | F04B 43/026 137/512.15 |
| 6,843,643 B2 * | 1/2005 | Fukami ................. | F04B 43/026 137/855 |
| 7,040,876 B2 * | 5/2006 | Fukami ................. | F04B 43/026 417/413.1 |
| 8,011,117 B2 * | 9/2011 | Acheson .............. | A43B 13/203 36/29 |
| 8,205,640 B2 * | 6/2012 | Kawamura ............. | F04B 17/04 137/516.25 |
| 9,453,504 B2 * | 9/2016 | Fukami ................. | F04B 43/026 |
| 9,545,860 B2 * | 1/2017 | Bocsanyi ................. | B60N 2/66 |
| 9,618,131 B2 * | 4/2017 | Lee ........................ | F16K 15/148 |
| 9,772,038 B2 * | 9/2017 | Steigert ..................... | F16K 7/12 |
| 2003/0086803 A1 | 5/2003 | Fukami et al. | |
| 2005/0196302 A1 * | 9/2005 | Huang .................. | F04B 43/026 417/412 |
| 2008/0185062 A1 * | 8/2008 | Johannes Nijland ........................ | F16K 15/148 137/854 |
| 2012/0301338 A1 * | 11/2012 | Cai ....................... | F04B 43/026 417/480 |
| 2018/0010587 A1 * | 1/2018 | Douglas ................ | F04B 43/021 |

FOREIGN PATENT DOCUMENTS

| | | |
|---|---|---|
| CN | 201062575 Y | 5/2008 |
| CN | 101191478 A | 6/2008 |
| CN | 202250732 U | 5/2012 |
| CN | 202789442 U | 3/2013 |
| CN | 203239517 U | 10/2013 |
| CN | 103573613 A | 2/2014 |
| CN | 103671035 A | 3/2014 |
| CN | 103671079 A | 3/2014 |
| CN | 203627154 U | 6/2014 |
| CN | 203627204 U | 6/2014 |
| CN | 203627205 U | 6/2014 |
| EP | 1308622 A2 | 5/2003 |
| JP | S636937 A | 1/1988 |
| JP | 2003206867 A | 7/2003 |

OTHER PUBLICATIONS

European Patent Application No. 14855232.6 Extended Search and Opinion dated Nov. 17, 2017, 9 pages.
Japanese Patent Application No. 2015-560544 Notification of Reasons for Refusal dated Jul. 12, 2016, 3 pages.
Japanese Patent Application No. 2015-560544 English translation of Notification of Reasons for Refusal dated Jul. 12, 2016, 3 pages.

* cited by examiner

VALVE CLACK AND AIR PUMP HAVING SAME

RELATED APPLICATIONS

This U.S. application claims priority under 35 U.S.C. 371 to, and is a U.S. National Phase application of, the International Patent Application No. PCT/CN2014/089475, filed on Oct. 24, 2014, which claims the benefit of prior Chinese Applications No. 201310512092.7 filed on Oct. 25, 2013, No. 201310514092.0 filed on Oct. 25, 2013, No. 201310512134.7 filed on Oct. 25, 2013 and No. 201420565479.9 filed on Sep. 28, 2014. The entire contents of the before-mentioned patent applications are incorporated by reference as part of the disclosure of this U.S. application.

FIELD

Embodiments of the present invention generally relate to an air pump field, and more particularly, to a valve clack and an air pump having the same.

BACKGROUND

Currently, the conventional air pump usually uses a valve clack shown in FIG. 1 as an air outtake one-way flow distribution device, in which the valve clack has a circular shape on the whole and includes three blades 1'. The blades 1' are elastically swingable and spaced apart from one another by three ribs 2' arranged radially, and each blade 1' has two ends integrally connected with the rib 2' respectively in a circumferential direction. The valve clack further includes a mounting column 3' in the middle of a top surface thereof, and the mounting column 3' has a flat top surface. With the valve clack in the air pump, a corresponding air outtake hole is opened or closed by up and down swings of each blade 1', so that a one-way flow distribution can be implemented. Specifically, each blade 1' swings upwards under a pressure of airflow so as to open the corresponding air outtake hole in the air pump, and thus the airflow passes through the air outtake hole and across the top surface of the mounting column to enter into an air discharging pipe of the air pump. Since the top surface of the mounting column of the valve clack is a plane structure, a big flowing area and a fast flowing speed of the airflow are resulted in when the airflow flows through the top surface of the mounting column of the valve clack, so that a loud airflow noise is produced and thus a loud noise is resulted in when the air pump is running, which will bring a noise pollution to people's lives.

In addition, the conventional air pump usually uses a motor to drive a linkage mechanism to pull or compress a piston, so as to implement an air suction and an air exhaust, cooperated with the air intake and outtake one-way flow distribution device. In the current pump, the air intake and outtake one-way flow distribution device is generally formed in such a manner that a spacer is sealingly connected with an upper cover having the air discharging pipe in a supersonic wave manner, air intake and outtake chambers are spaced from each other and an air outtake one-way valve is used to perform the air outtake flow distribution. Since the spacer is sealingly connected with the upper cover in the supersonic wave manner, when a welding quantity of each part of the supersonic wave is uneven, a compression quantity of each edge of the spacer tends to be inconsistent with one another, and thus the air outtake one-way valve tends to be tilted and deformed. In addition, since the one-way air outlet valve in the related art generally is a plane structure, it is easy for the elastic fatigue to happen to the air outlet one-way valve after a plurality of movements of the air outlet one-way valve. Thus, the air outlet one-way valve is caused to be tilted and deformed, which finally results in a poor gas tightness of the air outlet one-way valve and reduces a gas tightness of the air pump.

SUMMARY

Embodiments of the present invention seek to solve at least one of the problems existing in the related art to at least some extent. Accordingly, an object of the present invention is to provide a valve clack, which can reduce airflow noise effectively so as to achieve a goal of reducing noise of an air pump.

Another object of the present invention is to provide an air pump having the valve clack.

The valve clack according to embodiments of a first aspect of the present invention includes: a mounting column having a plurality of air slots for dispersing an airflow at least in a top surface of the mounting column; a plurality of blades arranged outside the mounting column in a circumferential direction of the mounting column, each blade having a radial inner end connected to the mounting column and elastically swingable with respect to the mounting column.

With the valve clack according to embodiments of the present invention, by providing the air slots at least in the top surface of the mounting column, the airflow may be separated into several small ones when passing across the top surface of the mounting column, and thus a speed of the airflow is decreased, so that the noise of the airflow is reduced and thus the noise of the air pump also is reduced.

In some embodiments, each of the plurality of air slots is positioned in the top surface of the mounting column and has two open ends.

In some embodiment, the mounting column has a central part in a center thereof, in which the plurality of air slots extends outside from the central part in a radial direction, and at least two of the plurality of blades are corresponding to at least one of the plurality of air slots in the circumferential direction. Therefore, the airflow can be guided and distributed well by respective air slots, which further reduces the speed of the airflow and thus further reduces the noise of the airflow.

In some embodiments, radial lengths or depths of the plurality of air slots are different.

In some embodiments, the central part is recessed downwards from an upper surface of a protrusion.

In some embodiments, the central part is protruded upwards from the upper surface of the protrusion.

In some embodiments, the central part is configured as a cylinder or a prism protruded upwards.

In some embodiments, the central part is configured as a tip protruded upwards.

In some embodiments, the mounting column is configured to have a substantially triangular prism or cylindrical shape.

In some embodiments, adjacent ones of the plurality of blades are separated by a rib, an end of the rib is connected to the mounting column, a buffer structure is provided in a position where the blade is connected to the rib, and the buffer structure is configured to provide a buffer space for a deformation of the blade. Thus, in an assembling process of the valve clack according to embodiments of the present invention, when the blade is squeezed and deformed, the deformation thereof can be released by the buffer structure, and thus an arching phenomenon is prevented from appearing in the blade and a gas tightness of the air pump is ensured.

In some embodiments, the buffer structure is configured as a notch formed at a radial outer end of the blade and adjacent to the rib; or the buffer structure is configured as a film connected between the rib and the radial outer end of the blade.

In some embodiments, each of the plurality of blades has an arc-shaped edge.

The air pump according to embodiments of a second aspect of the present invention includes: an upper cover defining an air outlet; a valve seat disposed at a bottom of the upper cover; a spacer disposed between the valve seat and the upper cover and defining an air intake chamber and an air outtake chamber spaced apart from each other with the valve seat and the upper cover, the air intake chamber having an air intake passage communicated therewith, the air outtake chamber having an air outtake passage communicated therewith, the spacer having a valve clack according to above embodiments of the invention, in which the blade is elastically swingable with respect to the mounting column, so that air flows in a one-way direction from the bottom up; an air intake one-way valve disposed and movable in the air intake passage so as to make the air flow in the one-way direction from the bottom up; a piston assembly disposed under the valve seat.

In some embodiments, the valve seat defines a receiving chamber configured to receive the valve clack, the air outtake passage is formed in a bottom wall of the receiving chamber, and the air intake passage is formed in a part of the valve seat, in which the part of the valve seat is outside the receiving chamber in a radial direction.

In some embodiments, the spacer further includes a spacer body disposed around the valve clack and having an outer contour matching the bottom of the upper cover; the spacer body defines a first air intake channel communicated with the air intake chamber, and a first air outtake channel communicated with the air outtake chamber is defined between an inner edge of the spacer body and the blade. Therefore, the air intake chamber and the air outtake chamber are spaced apart from each other by a sealing fit between the spacer body and the upper cover, in which the sealing fit is formed according to a rubber sealing characteristic of the spacer body and a sealing of the upper cover. Compared with the conventional sealing in a supersonic wave manner, a rubber compression quantity of the spacer in the air pump according to embodiments of the present invention is easy to control, and the blade is prevented from being tilted and deformed due to a larger compression quantity of the spacer.

In some embodiments, the blade has a thickness gradually decreased in a direction from the radial inner end of the blade to the radial outer end of the blade.

In some embodiments, the blade has a lower surface in flush with a lower end surface of the spacer body, and an upper surface of the blade is lower than an upper surface of the spacer body and gradually inclined in the direction from the radial inner end of the blade to the radial outer end of the blade. Thus, the end of the blade is prevented from being tilted and deformed due to the inconsistent or too large compression quantity of each edge of the spacer, and the end of the blade also is prevented from being tilted and deformed due to an elastic fatigue thereof after multiple movements, thus improving the gas tightness of the air pump greatly.

In some embodiments, the valve seat further has a second air intake channel and a second air outtake channel, the air intake passage consists of the first air intake channel and the second air intake channel, the air outtake passage consists of the first air outtake channel and the second air outtake channel, in which the air intake one-way valve is disposed at the second air intake channel.

In some embodiments, the piston assembly includes: a piston diaphragm disposed under the valve seat and having a plurality of air bags, each air bag being recessed downwards and having a piston chamber therein; a cylinder body disposed under the piston diaphragm, through which the air bag is passed; a base seat disposed under the cylinder body; a linkage mechanism disposed on the base seat and fitted with the plurality of air bags of the piston diaphragm; a motor disposed under the base seat and having a driving shaft extended into the base seat to drive the linkage mechanism to actuate the plurality of air bags to move.

In some embodiments, an air intake groove is formed in the base seat, a third air intake channel is defined between the cylinder body and a side wall of a top end of the piston diaphragm, a first air intake hole is formed in the valve seat, a second air intake hole communicated with the air intake chamber is formed in the spacer, in which the air intake groove is communicated with the first air intake hole via the third air intake channel, and the second air intake hole is corresponding to the first air intake hole in an up and down direction; each of a number of the blades of the valve clack, a number of the air intake one-way valves, a number of the air intake passages, a number of the third air intake channels, a number of the air outtake passages, a number of the first air intake holes and a number of the second air intake holes is the same as that of the air bags.

In some embodiments, the upper cover defines an air inlet communicated with the air intake chamber; each of a number of the blades of the valve clack, a number of the air intake one-way valves, a number of the air intake passages and a number of the air outtake passages is the same as that of the air bags.

With the air pump according to embodiments of the present invention, the spacer is connected with the upper cover by directly using a rubber sealing instead of the supersonic wave, and a structure of the blade is improved so as to prevent the blade from being tilted and deformed, thus greatly improving the gas tightness of the air pump.

Additional aspects and advantages of embodiments of present invention will be given in part in the following descriptions, become apparent in part from the following descriptions, or be learned from the practice of the embodiments of the present invention.

BRIEF DESCRIPTION OF THE DRAWINGS

These and other aspects and advantages of embodiments of the present invention will become apparent and more readily appreciated from the following descriptions made with reference to the accompanying drawings, in which:

FIG. 7b is a top view of the spacer shown in FIG. 7a;

FIG. 7c is a sectional view of the spacer shown in FIG. 7a;

FIG. 8b is a front view of the spacer shown in FIG. 8a;

REFERENCE NUMERALS

Figure 1:
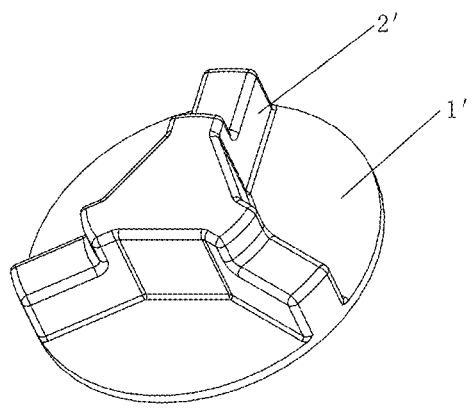
FIG. 1 is a schematic view of a conventional valve clack.

Spacer 1;
Valve clack 10; mounting column 11; air slot 111; mounting hole 112; central part 113; blade 12; rib 13;
Notch 14a; film 14b;
Spacer body 15; second air intake hole 16;
First air intake channel 101; first air outtake channel 102;
Upper cover 2; air outlet 21; air inlet 22;
Valve seat 3; second air intake channel 301; second air outtake channel 302; first air intake hole 31; receiving chamber 32;
Piston assembly 4; third air intake channel 401;
Piston diaphragm 41; air bag 411; piston chamber 412; cylinder body 42; base seat 43;
Linkage mechanism 44;
Linkage bracket 441; through hole 4411; positioning post 4412; eccentric wheel 442; inclined hole 4421; steel needle 443;
Motor 45; driving shaft 451; gasket 46; protective cover 47;
Air intake one-way valve 5; snap part 6.

DETAILED DESCRIPTION

Reference will be made in detail to embodiments of the present invention. Embodiments of the present invention will be shown in drawings, in which the same or similar elements and the elements having same or similar functions are denoted by like reference numerals throughout the descriptions. The embodiments described herein according to drawings are explanatory and illustrative, not construed to limit the present invention.

In the specification, unless specified or limited otherwise, relative terms such as "up", "down", "top", "bottom", "inner", "outer", "circumferential" as well as derivative thereof should be construed to refer to the orientation as then described or as shown in the drawings under discussion. These relative terms are for convenience of description and do not require that the present invention be constructed or operated in a particular orientation. In addition, terms such as "first" and "second" are used herein for purposes of description and are not intended to indicate or imply relative importance or significance. Thus, features limited by "first" and "second" are intended to indicate or imply including one or more than one these features. In the description of the present invention, "a plurality of" relates to two or more than two.

In the description of the present invention, unless specified or limited otherwise, it should be noted that, terms "mounted," "connected" and "coupled" may be understood broadly, such as permanent connection or detachable connection, electronic connection or mechanical connection, direct connection or indirect connection via intermediary, inner communication or interaction between two elements. These having ordinary skills in the art should understand the specific meanings in the present invention according to specific situations.

A valve clack 10 according to embodiments of the present invention will be described in the following with reference to FIGS. 2-3 and 7-9c. The valve clack 10 is used in an air pump as an air outtake one-way flow distribution device.

The valve clack 10 according to embodiments of the present invention includes a mounting column 11 and a plurality of blades 12, and a plurality of air slots 111 configured to disperse an airflow is formed at least in a top surface of the mounting column 11. It can be understood that "formed at least in a top surface of the mounting column 11" indicates that the air slot may also be formed in other parts of the mounting column 11, such as a side surface thereof. The plurality of blades 12 is arranged outside the mounting column 11 in a circumferential direction of the mounting column 11, and each blade 12 has a radial inner end connected to the mounting column 11 and elastically swingable with respect to the mounting column 11.

Therefore, with the valve clack 10 according to embodiments of the present invention, by providing the air slots 111 at least in the top surface of the mounting column 11, the airflow can be dispersed into several small ones when passing across the top surface of the mounting column 11, so a speed of the airflow is decreased and an airflow noise is reduced, thus achieving a goal of reducing noise of the air pump.

Figure 2:
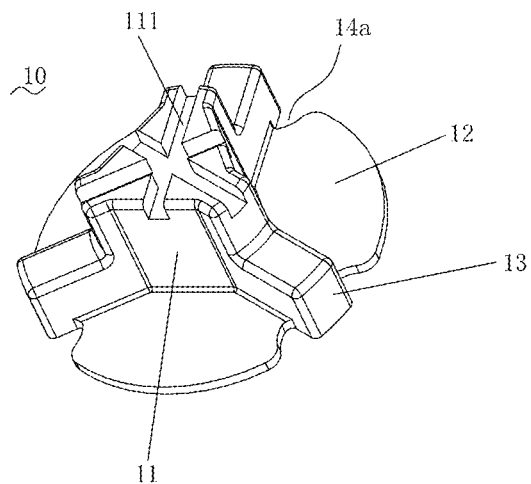
FIG. 2 is a schematic view of a valve clack according to an embodiment of the present invention.
Figure 7A:
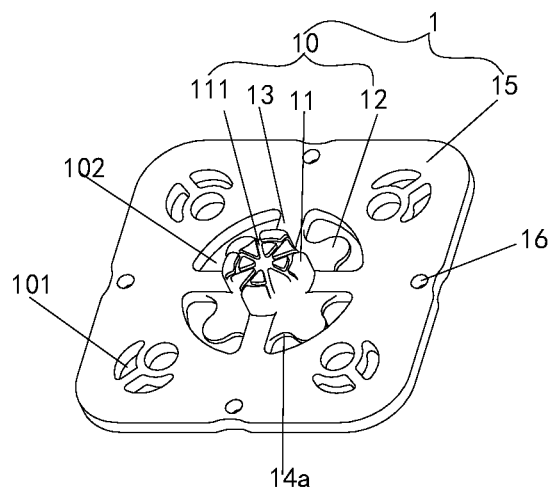
FIG. 7a is a schematic view of a spacer of an embodiment of the air pump shown in FIG. 6.
Figure 7B:
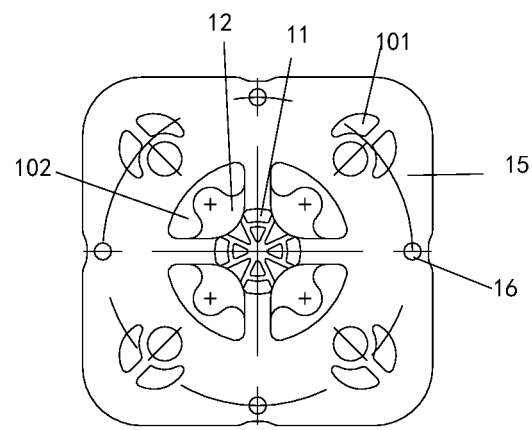

In an embodiment of the present invention, the air slot 111 is formed in the top surface of the mounting column 11, and has two open ends. Alternatively, as shown in FIGS. 2 and 7, the mounting column 11 has a central part 113 in a center thereof, the plurality of air slots 111 are extended outwards from the central part 113 in a radial direction, and at least two blades 12 are corresponding to at least one air slot 111 in the circumferential direction. Thus, the airflow can be well guided and divided by the air slots 111, and the speed of the airflow can be further decreased, thereby further reducing the noise of the airflow. Alternatively, the plurality of air slots 111 may have different radial lengths, so a flowing passage of the airflow can be extended to an extreme so as to reduce the noise of the flowing airflow more effectively, thus further reducing the noise generated when the air pump is running. Certainly, in some embodiments, the plurality of air slots 111 may also have different depths, and thus the airflow can be denoised in the air slots 111 having different depths. Preferably, the air slot 111 has a smoothly transited interior, and thus a turbulent flow can be prevented from being generated in the air slot 111. Advantageously, a communicating slot (not shown) may be formed between adjacent air slots 111. In this way, when the speed of the airflow in one air slot 111 is higher than that of the airflow in another air slot 111, the airflow having the high speed in the one air slot 111 may flow into the other air slot 111 in which the airflow has a low speed through the communicating slot, and thus the speed of the airflow in the air outtake chamber 14 can be reduced sufficiently and effectively.

Figure 8A:
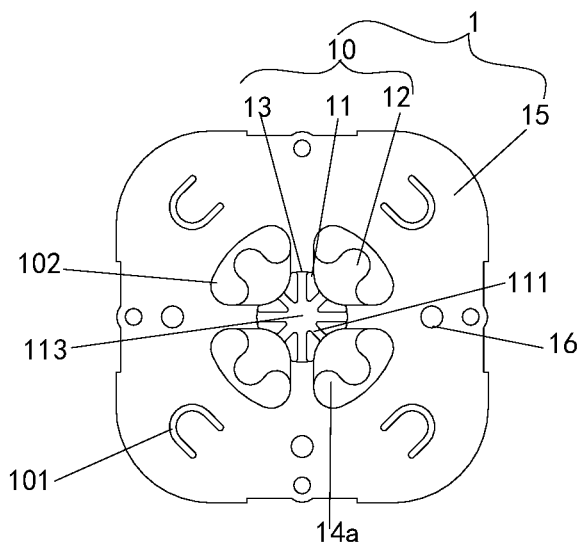
FIG. 8a is a schematic view of a spacer of another embodiment of the air pump shown in FIG. 6.
Figure 8B:
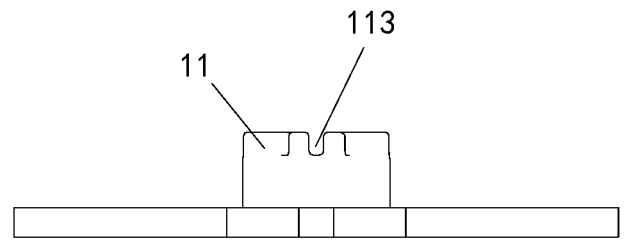

In an embodiment of the present invention, the central part 113 may be formed by downwards recessing a part of the upper surface of the mounting column 11, as shown in FIGS. 8a and 8b. A volume of a single air slot 111 is far less than that of the central part 113. In other words, the airflow flows into the downwards recessed central part 113 to be further denoised, after the speed of the airflow is reduced by the plurality of air slots 111 to denoise the airflow. Thus, the noise generated when the air pump is running can be further reduced.

Figure 9A:
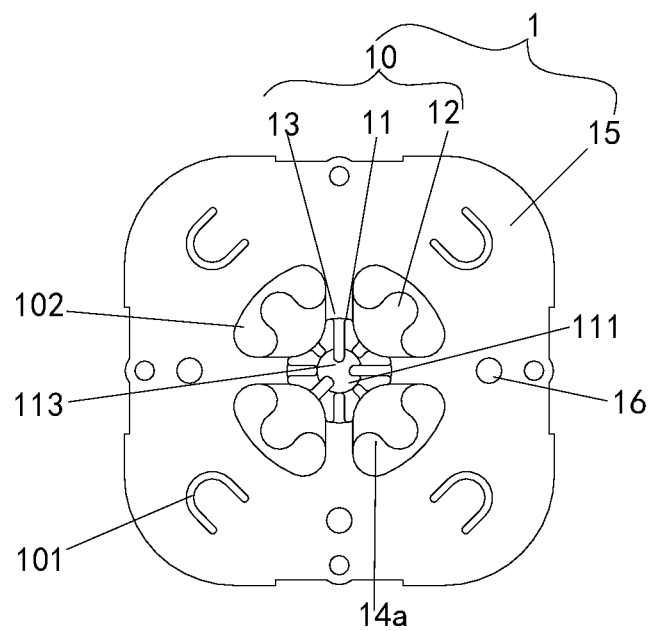
FIG. 9a is a schematic view of a spacer of another embodiment of the air pump shown in FIG. 6.
Figure 9B:
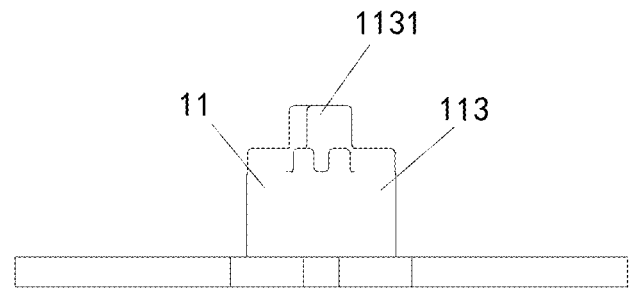
FIG. 9b is a front view of the spacer shown in FIG. 9a, in which a central part having a cylindrical shape is presented.
Figure 9C:
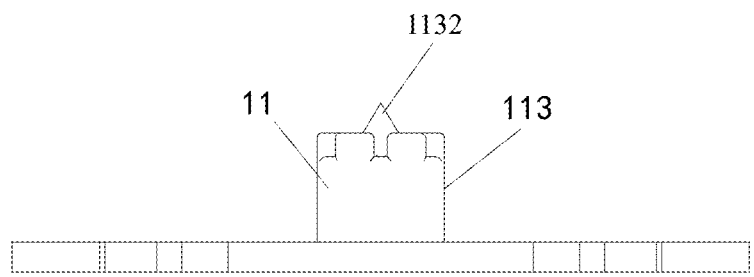
FIG. 9c is a front view of the spacer shown in FIG. 9a, in which a central part configured as a tip is presented.
Figure 10:
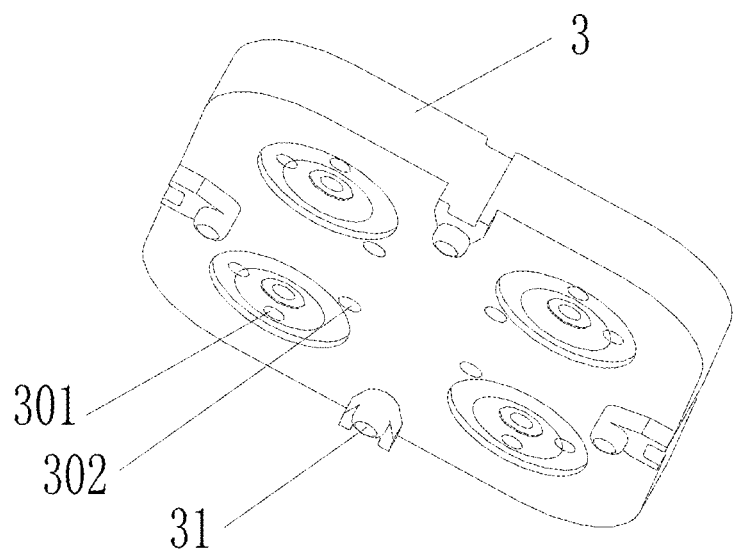
FIG. 10 is a schematic view of a valve seat of the air pump shown in FIG. 6.
Figure 11:
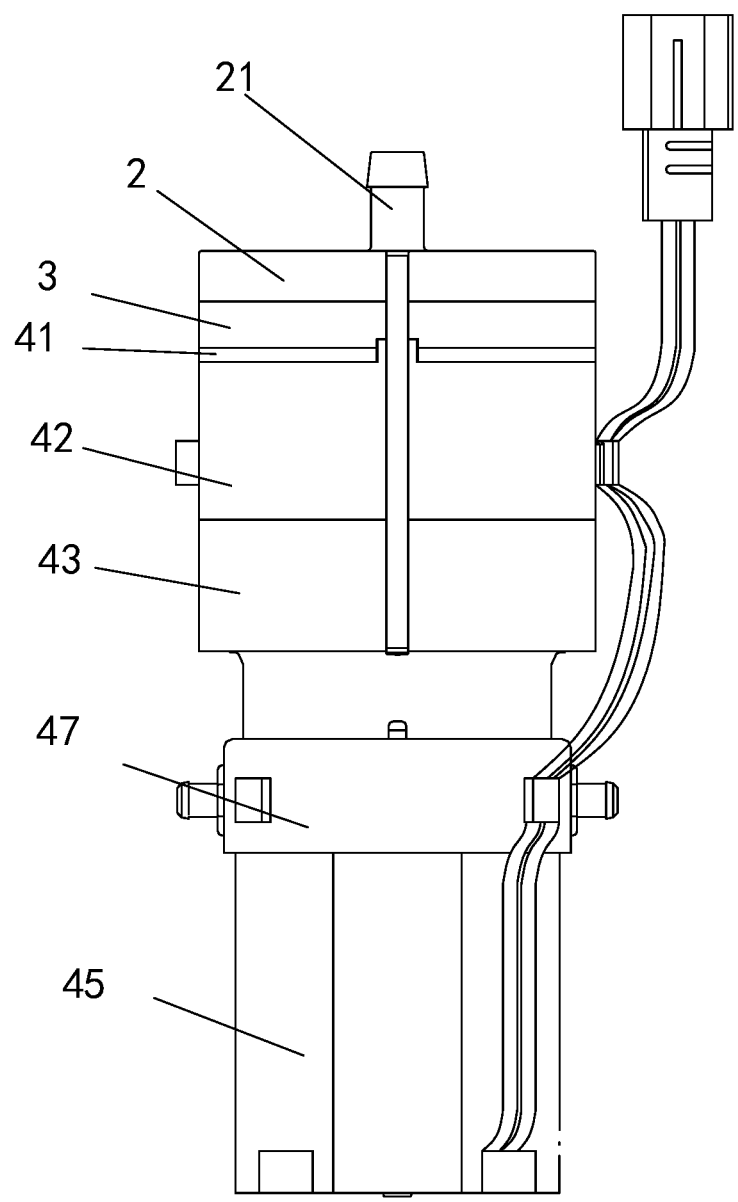
FIG. 11 is a front view of the air pump shown in FIG. 6.
Figure 12:
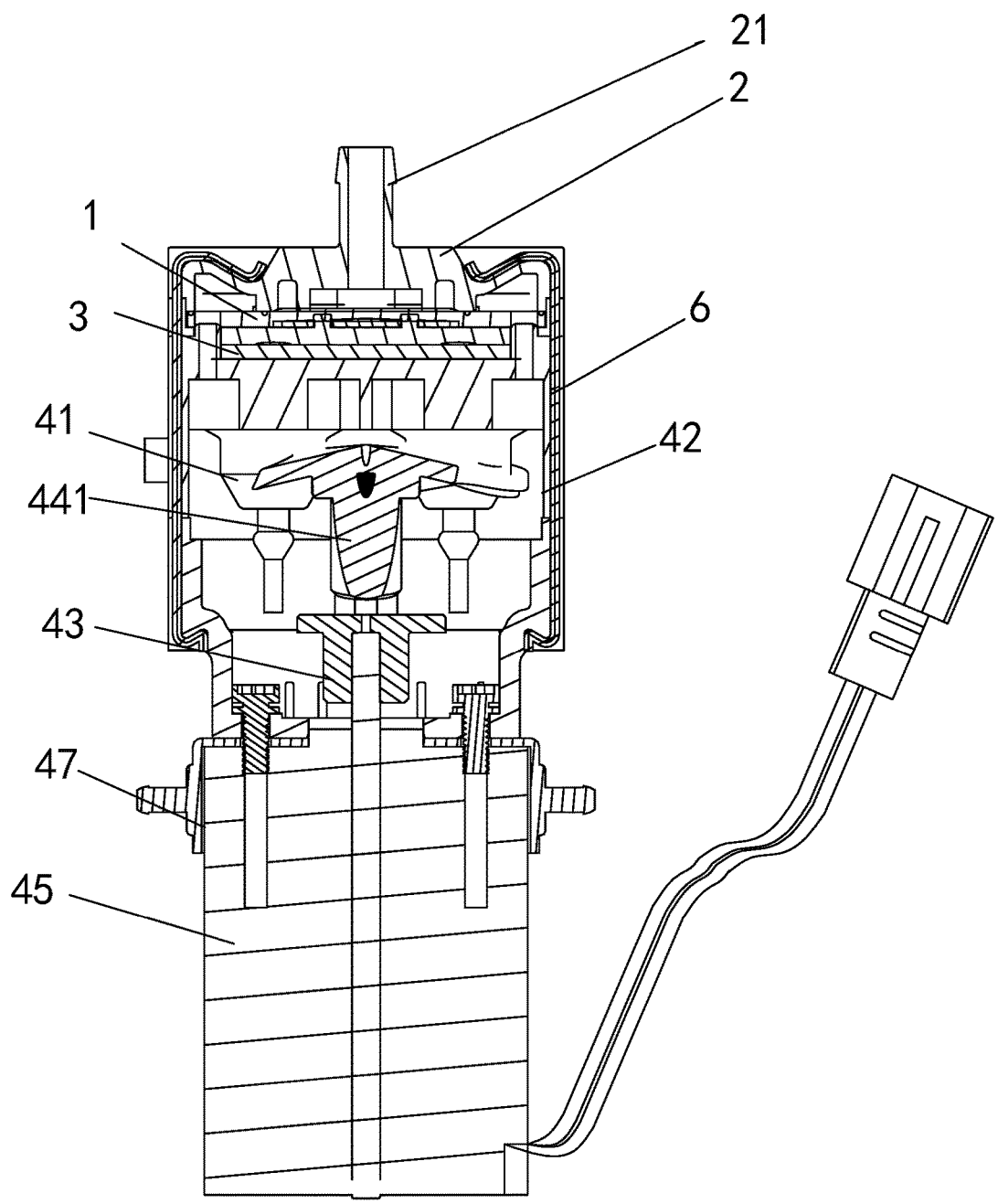
FIG. 12 is a sectional view of the air pump shown in FIG. 11.

As shown in FIGS. 9a-9c, in another embodiment of the present invention, the central part 113 is protruded upwards from the upper surface of the mounting column 11. Alternatively, as shown in FIGS. 9a and 9b, the central part 113 is configured as an upwards protruded cylinder 1131 or prism. The protruded cylinder 1131 or prism is extended into an air outtake channel, and a plurality of first flow guiding slots 262 are formed in an outer wall of the cylinder 1131 or prism. In this way, the airflow coming out of the air slot 111 flows into the air outtake channel along the second flow guiding slot 11311, so as to result in a gentle and stable airflow. Alternatively, as shown in FIGS. 9a and 9c, the central part 113 is configured as an upwards protruded tip 1132. The protruded tip 1132 is extended into an air outtake passage of the air pump, thus the airflow can flow into the air outtake passage along a smooth outer surface of the tip so as to ensure that the airflow flows out thereof smoothly.

In some embodiments, the mounting column 11 has a substantial triangular prism shape (as shown in FIG. 2) or a substantial cylinder shape (as shown in FIG. 7).

As shown in FIG. 2, according to some embodiments of the present invention, the adjacent blades 12 are separated by a rib 13, an end of the rib 13 is connected to the mounting column 11, a buffer structure is provided in a position where the blade 12 is connected to the rib 13, and the buffer structure is configured to provide a buffer space for a deformation of the blade 12. Thus, in an assembling process of the valve clack according to embodiments of the present invention, when the blade is squeezed and deformed, the deformation thereof can be released by the buffer structure, and thus an arching phenomenon is prevented from appearing in the blade and a gas tightness of the air pump is ensured.

In an alternative embodiment, the buffer structure is configured as a notch 14a formed at a radial outer end of the blade 12 and adjacent to the rib 13, as shown in FIG. 2. However, in another alternative embodiment, the buffer structure may also be configured as a film 14b connected between the radial outer end of the blade 12 and the rib 13. Thus, not only a deformation buffer space is provided for the assembling compression of each blade, but also the intensity of each blade is strengthened, thereby improving the performance of the air pump.

The valve clack according to embodiments of the present invention may include three or four blades, or more than four blades, which is determined according to application situations.

Figure 4:
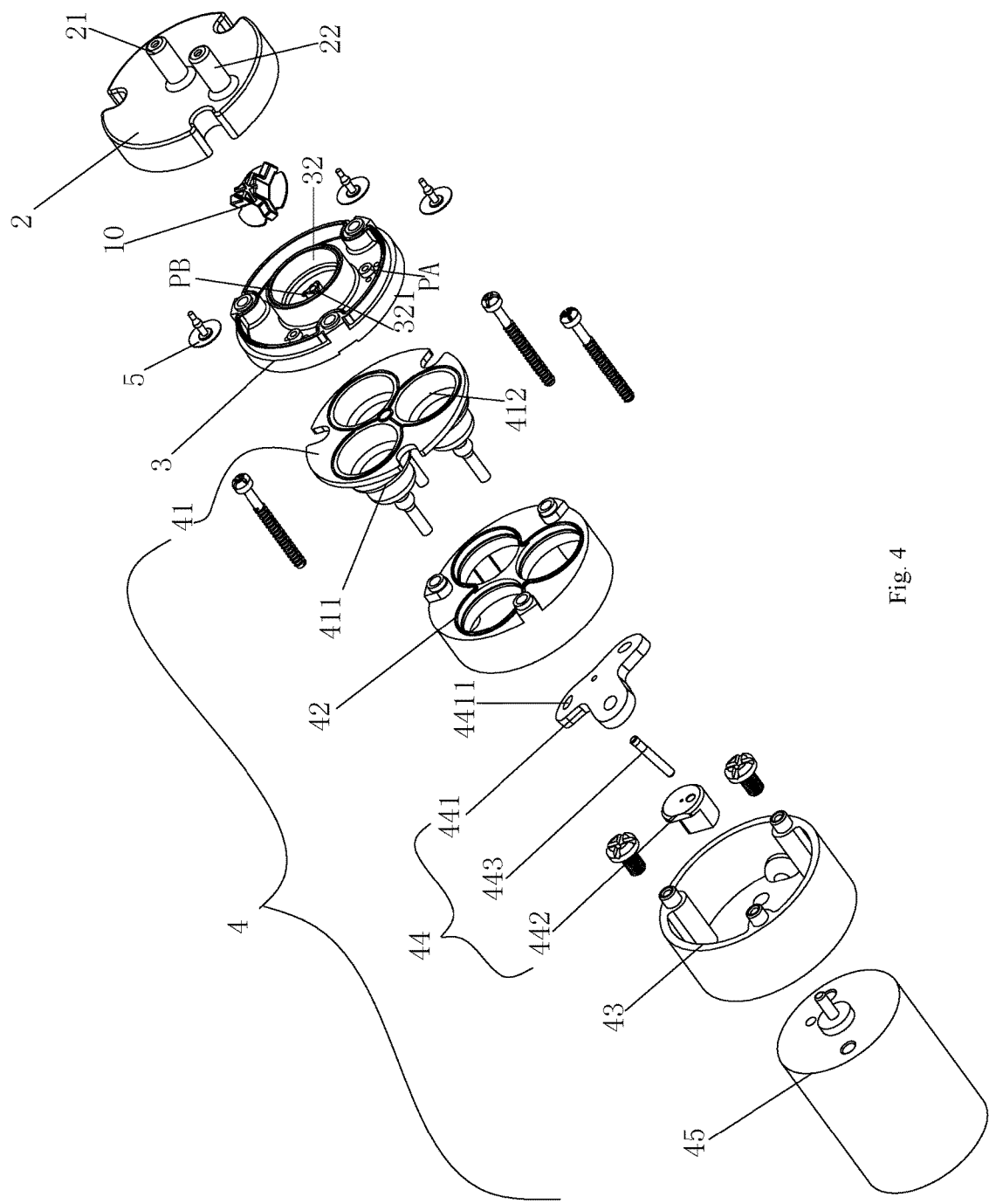
FIG. 4 is an exploded view of an air pump according to an embodiment of the present invention.
Figure 6:
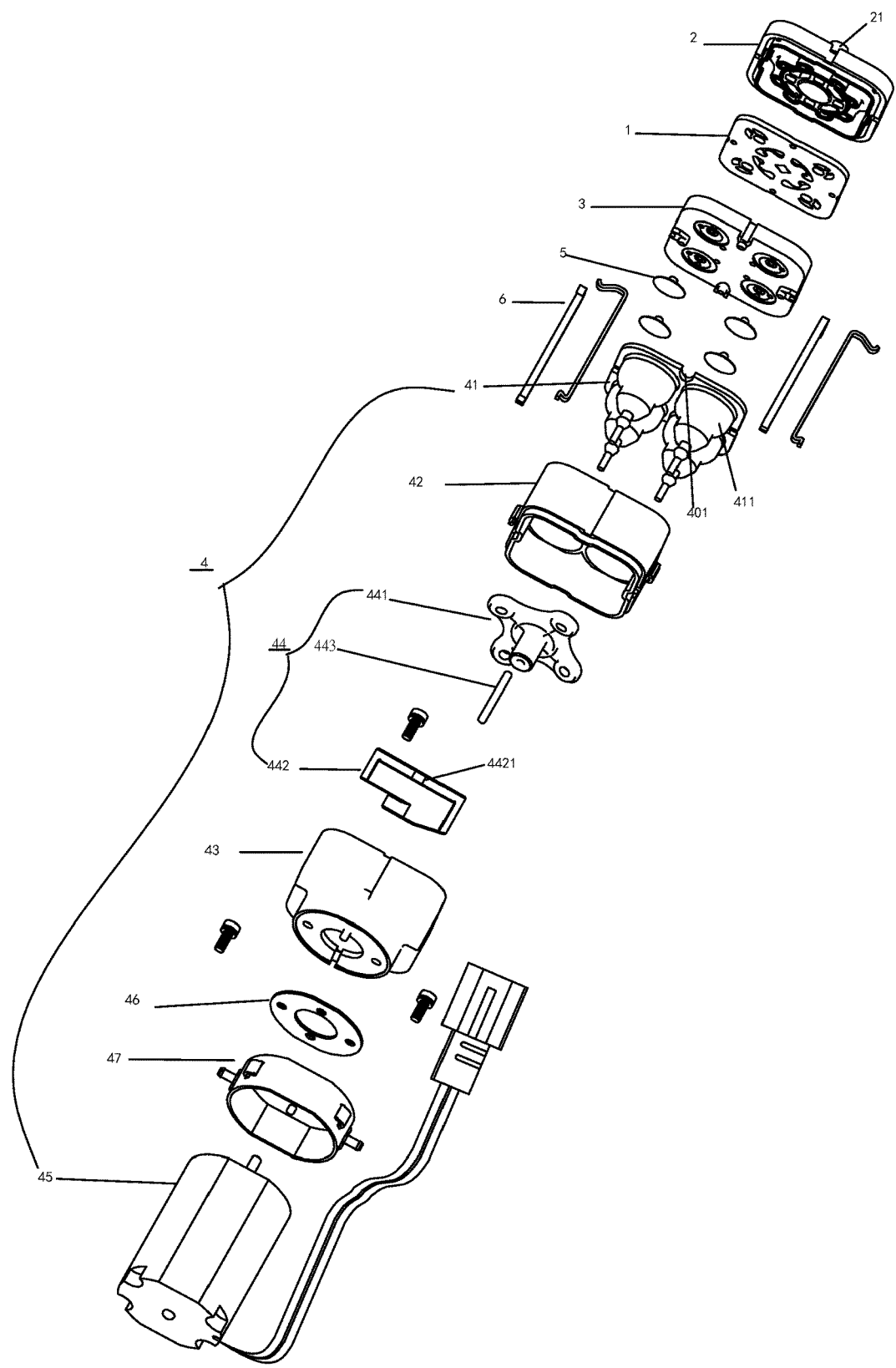
FIG. 6 is an exploded view of an air pump according to another embodiment of the present invention.

An air pump according to embodiments of a second aspect of the present invention includes an upper cover 2, a valve seat 3, a spacer 1, an air intake one-way valve 5 and a piston assembly 4. As shown in FIGS. 4 and 6, the upper cover 2 has an air outlet 21, and the valve seat 3 is disposed at a bottom of the upper cover 2. The spacer 1 is disposed between the valve seat 3 and the upper cover 2 and defines an air intake chamber and an air outtake chamber spaced apart from each other with the valve seat 3 and the upper cover 2. The air intake chamber has an air intake passage communicated therewith, and the air outtake chamber has an air outtake passage communicated therewith. The spacer 1 includes a valve clack 10 according to above embodiments of the present invention, and the blade is elastically swingable with respect to the mounting column, so that air flows in a one-way direction from the bottom up. The air intake one-way valve 5 is disposed and movable in the air intake passage so as to make the air flow in the one-way direction from the bottom up. Alternatively, the air intake one-way valve 5 has a bowl shape, an umbrella shape or a plane shape. The piston assembly 4 is disposed under the valve seat 3.

Specifically, the piston assembly 4 includes a piston diaphragm 41, a cylinder body 42, a base seat 43, a linkage mechanism 44 and a motor 45, as shown in FIGS. 4 and 6. The piston diaphragm 41 is disposed under the valve seat 3 and has a plurality of air bags 411, and each air bag is recessed downwards and has a piston chamber 412 therein. The cylinder body 42 is disposed under the piston diaphragm 41 and the air bag 411 is passed through the cylinder body 42, and the base seat 43 is disposed under the cylinder body 42. The linkage mechanism 44 is disposed on the base seat 43 and fitted with the plurality of air bags 411 of the piston diaphragm 41. The motor 45 is disposed under the base seat 43 and has a driving shaft extended into the base seat 43 to drive the linkage mechanism 44 to actuate the plurality of air bags 411 to move.

As shown in FIGS. 4 and 6, furthermore, the linkage mechanism 44 includes a linkage bracket 441, an eccentric wheel 442 and a steel needle 443. Specifically, the linkage bracket 441 is disposed under the cylinder body 42 and has a plurality of through holes 4411, and the plurality of through holes 4411 are fitted over and outside of the air bags 411 of the piston diaphragm 41 respectively. A positioning post 4412 is extended from a bottom of the linkage bracket 441, and the eccentric wheel 442 is disposed in the valve seat 3. The driving shaft 451 of the motor 45 is extended into the base seat 43 and fixed with the eccentric wheel 442, the eccentric wheel 442 has an inclined hole 4421 therein and a steel ball (not shown) is disposed at a bottom of the inclined hole. The steel needle 443 has a first end disposed within the inclined hole 4421 and a second end extended into the positioning post 4412 at the bottom of the linkage bracket 441.

Figure 5:
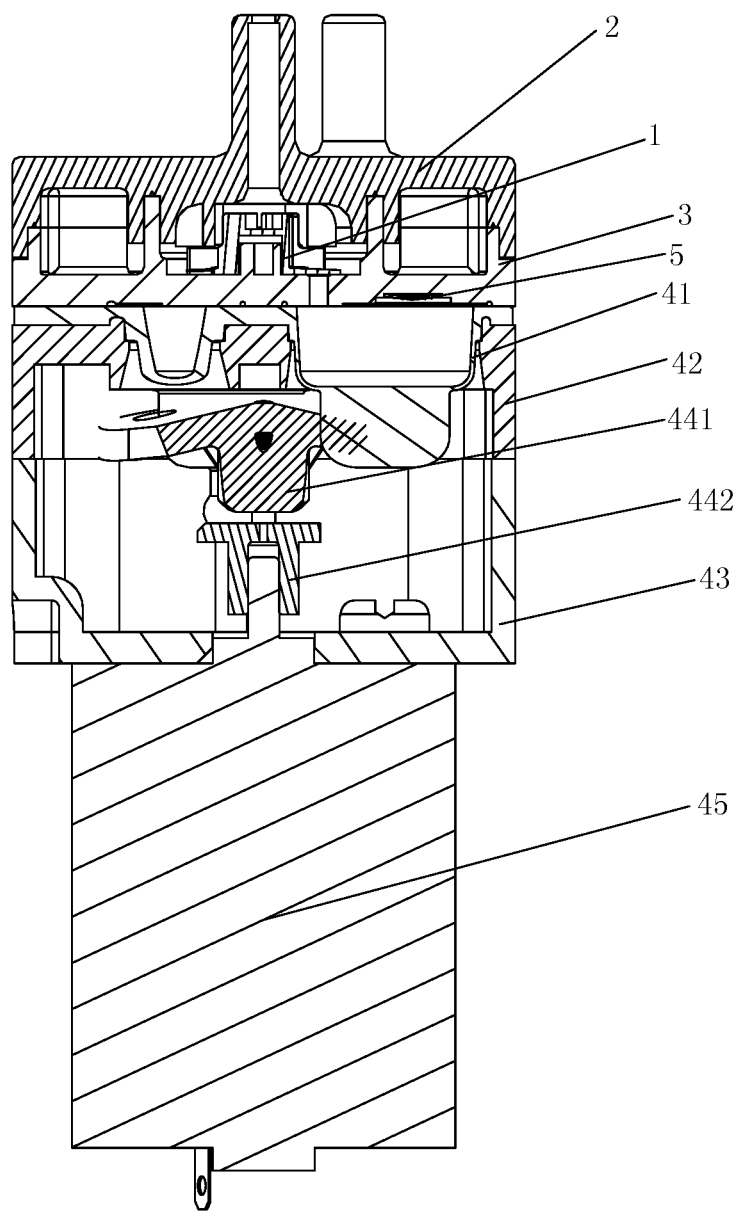
FIG. 5 is a sectional view of the air pump shown in FIG. 4.

In the air pump according to an embodiment of the present invention, as shown in FIGS. 4-5, the valve seat 3 has a receiving chamber 32 configured to receive the valve clack 10, the air outtake passage PB is formed in a bottom wall of the receiving chamber 32, and the air intake passage PA is formed in a part of the valve seat 3, in which the part of the valve seat 3 is outside the receiving chamber 32 in a radial direction. Alternatively, each of the air intake passage PA and the air outtake passage PB may have at least one air intake hole.

As shown in FIGS. 6-12, in the air pump according to another embodiment of the present invention, the spacer 1 further includes a spacer body 15, the spacer body 15 is disposed around the valve clack 10 and has an outer contour matching the bottom of the upper cover 2. The air intake chamber and the air outtake chamber are spaced apart from each other by a sealing fit between the spacer body and the upper cover, in which the sealing fit is formed according to a rubber sealing characteristic of the spacer body and a sealing of the upper cover. Compared with the conventional sealing in a supersonic wave manner, a rubber compression quantity of the spacer in the air pump according to embodiments of the present invention is easy to control, and the blade is prevented from being tilted and deformed due to a larger compression quantity of the spacer.

In addition, the spacer body 15 has a first air intake channel 101, and a first air outtake channel 102 is defined between an inner edge of the spacer body 15 and the blade 12. The blade 12 is elastically swingable with respect to the spacer body 15 and the mounting column 11, so that the air flows in the one-way direction from the bottom up. Correspondingly, the valve seat 3 further has a second air intake channel 301 and a second air outtake channel 302, the air intake passage consists of the first air intake channel 101 and the second air intake channel 301, and the air outtake passage consists of the first air outtake channel 102 and the second air outtake channel 302, in which the air intake one-way valve 5 is disposed at the second air intake channel 301.

In order to prevent the end of the blade from being tilted and deformed due to the inconsistent or too large compression quantity of each edge of the spacer, in a preferred embodiment of the present invention, the blade 12 has a thickness gradually decreased in a direction from the radial inner end of the blade to the radial outer end of the blade.

Figure 7C:
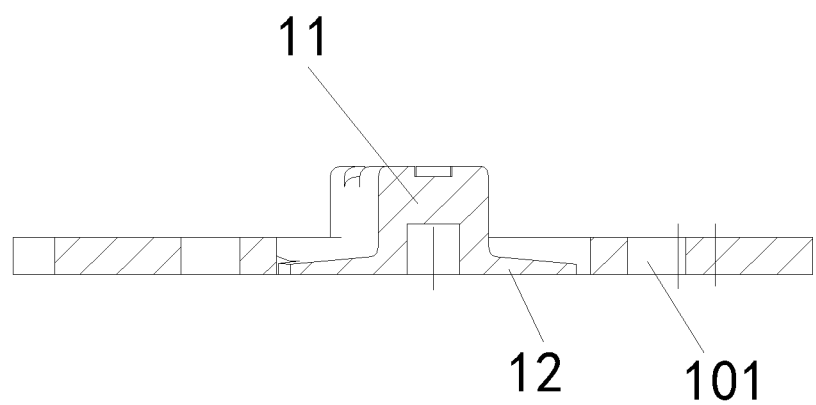

Furthermore, as shown in FIG. 7c, the blade 12 has a lower surface in flush with a lower end surface of the spacer body 15, and an upper surface lower than an upper surface of the spacer body 15 and gradually inclined in the direction from the radial inner end of the blade 12 to the radial outer end of the blade 12. Thus, the end of the blade is prevented from being tilted and deformed due to the inconsistent or too large compression quantity of each edge of the spacer, and the end of the blade also is prevented from being tilted and deformed due to an elastic fatigue thereof after multiple movements. Obviously, in embodiments of the present invention, a structure of the blade is improved and the gas tightness of the air pump is improved greatly. In addition, the blade is integrally connected with the spacer body, and thus a burring process of the end of the blade is omitted and the end of the blade is prevented from being deformed due to the burring process thereof.

Alternatively, the blade 12 has an arc-shaped outer edge, and a round corner is formed in a position in which the upper surface of the blade 12 is connected with the mounting column 11, so the end of the blade can be further prevented from being tilted and deformed, thus improving the gas tightness of the air pump.

The valve clack and the air pump having the same according to embodiments of the present invention will be described in the following with reference to FIGS. 2-12.

Embodiment 1

Figure 3:
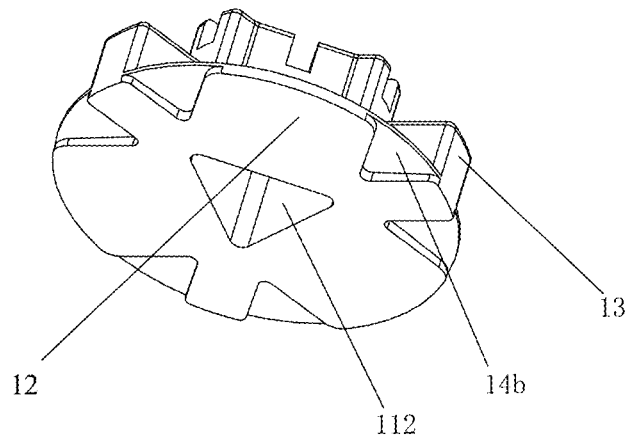
FIG. 3 is a schematic view from another perspective of a valve clack according to another embodiment of the present invention.

In the embodiment, as shown in FIGS. 2-3, the valve clack includes three blades.

As shown in FIG. 2, the valve clack 10 includes three blades 12 elastically swingable, three ribs 13 disposed in a radial direction and a mounting column 11 disposed in a central portion of a top surface of the valve clack 10. The three blades 12 of the valve clack 10 are distributed in a circumferential direction and appear as a similar circle on the whole, and adjacent two blades 12 are spaced apart from each other by the rib 13. A root portion of the blade 12 is integrally connected with the mounting column 11.

The mounting column 11 of the valve clack 10 has a similar triangular prism shape, and a mounting hole 112 extended to an interior of the mounting column 11 is formed in a bottom surface of the valve clack 10 (as shown in FIG. 3). The rib 13 of the valve clack 10 has a radial inner end integrally connected with a side surface of the mounting column 11. The mounting column 11 has six air slots 111 (certainly, the number of the air slots 111 is not limited to six), the six air slots 111 have different lengths and cross-sectional areas, and are disposed in the radial direction of the mounting column 11 respectively. Specifically, three air slots are disposed in directions of three included angles of the mounting column 11 respectively, and the other three air slots are disposed in directions perpendicular to three edges of the mounting column 11 respectively. Each of the six air slots 111 has two open ends, i.e., the two ends of each of the six air slots 111 are not closed so as to form a complete airflow passage, and the radial inner ends of the air slots 111 are communicated with one another.

A buffer structure is disposed at a radial outer end of the blade 12 configured to connect with the rib 13. As shown in FIG. 2, the buffer structure is a notch 14a, which is configured to provide a buffer space for deformation of the squeezed blade 12 in an assembling process thereof. In an embodiment as shown in FIG. 3, the buffer structure is a film 14b.

The air pump having the valve clack according to the above embodiment 1 will be described in the following with reference to FIGS. 4-5. Since the valve clack includes three blades 12, each of a number of air intake passages, a number of air outtake passages, and a number of air bags 411 of a piston diaphragm 41 is three.

In the air pump according to embodiments of the present invention, the valve seat 3 has a receiving chamber 32 configured to receive the valve clack 10. Specifically, a mounting shaft 321 is extended upwards from a bottom wall of the receiving chamber 32, and fitted within the mounting hole 112 formed in the bottom surface of the mounting column 11 of the valve clack 10 so as to mount the valve clack 10 into the receiving chamber 32. An upper cover 2 is corresponding to the valve seat 3 in an up and down direction, and an air intake chamber and an air outtake chamber spaced apart from each other are formed between the upper cover 2 and the valve seat 3. The air intake chamber is communicated with an air inlet 22 in the upper cover 2, and the air outtake chamber is communicated with an air outlet 21 in the upper cover 2 and the receiving chamber 32 of the valve seat 3.

As shown in FIG. 4, an air outtake passage is disposed in the bottom wall of the receiving chamber 32. In this time, the three blades 12 of the valve clack 10 are correspondingly attached to the air outtake passages of the valve seat 3 respectively. The air intake passage is formed in a part of the valve seat 3, in which the part of the valve seat 3 is outside the receiving chamber 32 in the radial direction, i.e., a peripheral part of the receiving chamber 32. The three air intake passages are communicated with the three air bags 411 of the piston diaphragm 41 respectively. In the embodiment as shown in FIG. 4, each air intake passage includes a group of six air intake holes.

Each air intake one-way valve 5 has an umbrella shape, and is disposed at the valve seat 3 and configured to open or close each group of air intake holes of the valve seat 3 in the one-way direction. A top end of the piston diaphragm 41, the cylinder body 42 and the base seat 43 are fixed to a bottom end of the valve seat 3 in turn by using a screw. The air bag 411 of the piston diaphragm 41 is fitted within the cylinder body 42, the linkage mechanism 44 and the motor 45 are disposed to the base seat 43, and the driving shaft 451 of the motor 45 is connected with the linkage mechanism 44 via a transmission connection. A sleeve connection fit is formed between the linkage mechanism 44 and the air bag 411 of the piston diaphragm 41. The air outtake hole and air intake hole of the valve seat 3 are corresponding to the air bag 411 of the piston diaphragm 41 respectively, i.e., the air outtake hole and the group of air intake holes of the valve seat 3 are communicated with the corresponding air bag 411 respectively, when the air outtake hole and the group of air intake holes of the valve seat 3 are in an open state.

As shown in FIGS. 4 and 5, the above linkage mechanism includes an eccentric wheel 442, a steel needle 443 and a linkage bracket 441. The motor 45 is disposed at a bottom end of the base seat 43, the eccentric wheel 442 is disposed in the base seat 43 and the driving shaft 451 of the motor 45 is extended into the base seat 43 and fixed with the eccentric wheel 442. The eccentric wheel 442 is connected with the linkage bracket 441 via the steel needle 443. The linkage bracket 441 has three through holes 4411 therein fitted with the air bags 411 of the piston diaphragm 41 one to one respectively.

An operation process of the air pump according to embodiments of the present invention is shown as follows. After the valve clack 10 is mounted, the motor 45 outputs a certain torque and a certain angular speed when powered, so as to drive the eccentric wheel 442 to rotate, and the rotation motion of the eccentric wheel 442 is converted into the reciprocal rectilinear motion of the air bag 411 by the steel needle 443 and the linkage bracket 441, and thus an air suction and an air exhaust of the air pump are implemented and the air pump outputs a certain flow and a certain pressure. In one rotation cycle of the eccentric wheel 442, the three air bags 411 of the piston diaphragm 41 implement one air suction and one air exhaust respectively. When the air bag 411 of the piston diaphragm 41 sucks air, the air enters into the air intake chamber through the air inlet 22 of the upper cover 2 and elastically deforms the air intake one-way valve 5 to open three groups of air intake holes of the valve seat 3, so the air enters into the air bag 411 of the piston diaphragm 41. Then, a volume of the air bag 411 of the piston diaphragm 41 increases and the air suction of the air pump is implemented. When the air bag 411 of the piston diaphragm 41 exhausts air, the air intake one-way valve 5 is reset to close the three groups of air intake holes of the valve seat 3, the air acts on the blade 12 of the valve clack 10 to elastically deform the blade 12 of the valve clack 10 upwards by the pressure thereof, so the air outtake hole of the valve seat 3 is opened, the air enters into the receiving chamber 32 and flows towards the air slot 111 in the top surface of the mounting column 11. Since the air slot 111 has a small cross sectional area and different air slots 111 have different lengths, when the air flows across the air slot 111 in the top surface of the mounting column 11, a speed of the air is decreased and the air is dispersed into several small airflows having different speeds, so the noise of the air is reduced and the noise of the air pump also is reduced. Finally, the small airflows are discharged out from the air outlet 21 of the upper cover 2 and input into a corresponding pneumatic actuator. In this process, the volume of the air bag 411 of the piston diaphragm 41 decreases and the air exhaust is completed.

In the air pump according to embodiments of the present invention, since the buffer structure (such as the notch 14a or the film 14b) is provided between the blade 12 of the valve clack and the rib 13 of the valve clack, the blade 12 cannot be deformed in any condition during the assembling process of the valve clack 10, i.e., the arching phenomenon will not appear after the blade 12 is assembled, and the blade 12 can be closely attached to the air outtake hole of the valve clack 3, thus ensuring the gas tightness of the air pump. The notch 14a at the end of the blade 12 provides a relaxing space of deformation (i.e., the buffer space of deformation) for the blade 12, and thus there is no possibility for the blade 12 to be squeezed and deformed.

Certainly, the structure of the air pump may be different from that of the above embodiment, for example, the number of the air bags 411 may not be limited to three, i.e., the number of the air bags 411 may be two or four. The air may be sucked through other air intake structures besides the air inlet 22 of the upper cover 2, for example, the air may be sucked through a gap between the base seat 43 and the cylinder body 42.

A valve clack 10 and an air pump having the same according to another embodiment of the present invention will be described in the following with reference to FIGS. 6-12, in which the valve clack includes four blades 12.

Embodiment 2

In an embodiment as shown in FIGS. 7-9c, the valve clack 10 includes a mounting column 11 and four blades 12 distributed in a circumferential direction of the mounting column 11, and each blade 12 has a root portion integrally connected with the mounting column 11. The mounting column 11 of the valve clack 10 has a cylindrical shape. The mounting column 11 has eight air slots 111 (certainly, the number of the air slots 111 may not be limited to eight), the eight air slots 111 have different lengths and cross sectional areas, and the eight air slots 111 are distributed in a radial direction of the mounting column 11 respectively. Specifically, the eight air slots are uniformly distributed in the circumferential direction of the mounting column 11. The air slot 111 has two open ends, i.e., the ends of the air slots 111 are not closed, so a complete air passage can be formed and radial inner ends of the eight air slots are communicated with one another.

The valve clack 10 according to the embodiment of the present invention and a spacer body 15 disposed around the valve clack 10 constitute a spacer 1. Therefore, adjacent two blades are spaced apart from each other by a rib 13, and the rib 13 is connected between the mounting column 11 and the spacer body 15. A buffer structure is disposed at a radial outer end of the blade 12 configured to connect with the rib 13. As shown in FIG. 7, the buffer structure is a notch 14a and configured to provide a buffer space for deformation of the blade 12. Preferably, the blade 12 has an arc-shaped outer edge, and a round corner is formed in a position in which an upper surface of the blade 12 is connected with the mounting column 11, so the end of the blade can be further prevented from being tilted and deformed, thus improving the gas tightness of the air pump.

The air pump having the valve clack according to the above embodiment 2 will be described in the following with reference to FIGS. 6-12. Since the valve clack includes four blades 12, each of a number of air intake passages, a number of air outtake passages, and a number of air bags 411 of a piston diaphragm 41 is four.

In the air pump according to embodiments of the present invention, the spacer 1 includes the spacer body 15, the spacer body 15 is disposed around the valve clack 10 and has an outer contour fitted with a bottom of the upper cover 2. The spacer body 15 has a first air intake channel 101 and a first air outtake channel 102 is defined between an inner edge of the spacer body 15 and the blade 12. Correspondingly, the valve seat 3 further has a second air intake channel 301 and a second air outtake channel 302, the air intake passage consists of the first air intake channel 101 and the second air intake channel 301, the air outtake passage consists of the first air outtake channel 102 and the second air outtake channel 302, in which an air intake one-way valve 5 is disposed at the second air intake channel 301. The blade 12 of the valve clack 10 is elastically swingable with respect to the spacer body 15 and the mounting column 11, so that air flows in a one-way direction from the bottom up.

The blade 12 is integrally connected with a lower surface of the first air outtake channel 102 of the spacer 1, and the blade 12 has a thickness gradually decreased in a direction from interior to exterior (i.e., a direction starting from a position in which the blade 12 is integrally connected with the spacer 1 and extending outwards along a central axis of the blade 12, in which since the blade 12 is disposed in the radial direction of the spacer 1, the direction from interior to exterior indicates a outward radial direction of the spacer 1). Specifically, a top surface of the blade 12 is inclined, so the end of the blade 12 can be prevented from being tilted and deformed due to a too large compression quantity of the spacer 1 and/or an elastic fatigue of the blade 12 after multiple movements.

The piston assembly 4 includes a piston diaphragm 41 having four air bags 411, a cylinder body 42, a base seat 43, a linkage mechanism 44 and a motor 45. The cylinder body 42 and the base seat 43 are fixed on the bottom of the valve seat 3 in turns, the piston diaphragm 41 is fitted within the cylinder body 42, the linkage mechanism 44 and the motor 45 are disposed in the base seat 43 respectively, a driving shaft 451 of the motor 45 is connected with the linkage mechanism 44 via a transmission connection, and a sleeve connection fit is formed between the linkage mechanism 44 and the air bag 411 of the piston diaphragm 41. The base seat 43 has an air intake groove (not shown), a third air intake channel 401 is defined between the cylinder body 42 and a side wall of a top end of the piston diaphragm 41, a first air intake hole 31 is formed in the valve seat 3, a second air intake hole 16 communicated with the air intake chamber is formed in the spacer 1, and the air intake groove of the base seat 43 is communicated with the first air intake hole 31 of the valve seat 3 via the third air intake channel 401, and the second air intake hole 16 of the spacer 1 is corresponding to the first air intake hole 31 of the valve seat 3 in an up and down direction. Each of a number of the blades 12, a number of the air intake one-way valves 5, a number of the first air intake channels 101, a number of the second air intake channels 301, a number of the third air intake channels 401, a number of the first air outtake channels 102, a number of the second outtake channels 302, a number of the first air intake holes 31, and a number of the second air intake holes 16 is the same as that of the air bags 41 of the piston diaphragm 41 and has a one to one correspondence therewith. In addition, an air inlet communicated with the air intake chamber may be formed in the upper cover 2 without disposing the air intake groove, the third air intake channel 401, the first air intake hole 31 and the second air intake hole 16.

The linkage mechanism 44 includes an eccentric wheel 442, a steel ball (not shown), a steel needle 443 and a linkage bracket 441. The motor 45 is fixed to the bottom of the base seat 43 by using two screws (a gasket 46 is fitted between the bottom of the base seat 43 and the motor 45), a protective cover 47 is further fitted over the motor 45, the eccentric wheel 442 is disposed in the base seat 43, and the driving shaft 451 of the motor 45 is extended into the base seat 43 and fixed with the eccentric wheel 442. The eccentric wheel 442 has an inclined hole 4421 therein and the steel ball is disposed at a bottom of the inclined hole. The steel needle 443 has a first end disposed within the inclined hole 4421 and a second end extended into the linkage bracket 441. The linkage bracket 441 has four through holes, and the four air bags 411 of the piston diaphragm 41 are fitted within the four through holes respectively.

Alternatively, as shown in FIG. 6, the air pump further includes four snap parts 6. A snap groove adapted to fit with the snap part 6 is formed in each edge of the upper cover 2, the valve seat 3, the cylinder body 42 and the base seat 43. The upper cover 2, the valve seat 3, the cylinder body 42 and the base seat 43 are fixed together in turns from up to down by a snap connection fit between the snap part 6 and the snap groove.

An operation process of the air pump according to embodiments of the present invention is shown as follows. The motor 45 outputs a certain torque and a certain angular speed when powered, so as to drive the eccentric wheel 442 to rotate, and the rotation motion of the eccentric wheel 442 is converted into the reciprocal rectilinear motion of the piston diaphragm 41 by the steel ball, the steel needle 443 and the linkage bracket 441, and thus an air suction and an air exhaust of the air pump are implemented and the air pump outputs a certain flow and a certain pressure. In one rotation cycle of the eccentric wheel 442, the four air bags 411 of the piston diaphragm 41 implement one air suction and one air exhaust respectively. When the air bag 411 of the piston diaphragm 41 sucks air, the air enters into the third air intake channel 401 defined by the cylinder body 42 and the piston diaphragm 41 through the air intake groove of the base seat 43, then flows through the first air intake hole 31 of the valve seat 3 and the second air intake hole 16 of the spacer 1 to enter into the air intake chamber defined by the spacer 1 and the upper cover 2, then flows into the second air intake channel 301 of the valve seat 3 through the first air intake channel 101 of the spacer 1 and pushes the air intake one-way valve 5 to elastically deform the air intake one-way valve 5 so as to open the second air intake channel 301, so that the air enters into the air bag 411 of the piston diaphragm 41. Then, a volume of the air bag 411 of the piston diaphragm 41 increases and the air suction of the air pump is implemented. When the air bag 411 of the piston diaphragm 41 exhausts air, the air intake one-way valve 5 is reset to close the second air intake channel 301 of the valve seat 3, the air enters into the second air outtake channel 302 of the valve seat 3 and acts on the blade 12 of the valve clack 10 to elastically deform the blade 12 of the valve clack 10 by the pressure thereof, so the second air outtake channel 302 of the valve seat 3 is opened and the second air outtake channel 302 of the valve seat 3 is communicated with the air outtake chamber. Thus, the air enters into the air outtake chamber, and is discharged through the air outlet 21 of the upper cover 2 and is input into a corresponding pneumatic actuator. In this process, the volume of the air bag 411 of the piston diaphragm 41 decreases and the air exhaust is implemented.

With the air pump according to embodiments of the present invention, the spacer is connected with the upper cover by directly using a rubber sealing instead of the supersonic wave, and a structure of the blade is improved so as to prevent the blade from being tilted and deformed, thus greatly improving the gas tightness of the air pump.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present invention. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present invention. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present invention, and changes, alternatives, and modifications can be made in the embodiments without departing from spirit, principles and scope of the present invention.

What is claimed is:

1. A valve clack, comprising:
a mounting column having a plurality of air slots for dispersing an airflow at least in a top surface of the mounting column;
a plurality of blades arranged outside the mounting column in a circumferential direction of the mounting column, each blade having a radial inner end connected to the mounting column and elastically swingable with respect to the mounting column;
wherein each of the plurality of air slots is positioned in the top surface of the mounting column and has two open ends, the mounting column has a central part in a center thereof, in which the plurality of air slots extends outside from the central part in a radial direction, at least two of the plurality of blades are corresponding to respective one of the plurality of air slots in the circumferential direction, and radial lengths or depths of the plurality of air slots are different.

2. The valve clack according to claim 1, wherein the central part is recessed downwards from the top surface of the mounting column.

3. The valve clack according to claim 1, wherein the central part is protruded upwards from the top surface of the mounting column.

4. The valve clack according to claim 3, wherein the central part is configured as a cylinder or a prism protruded upwards.

5. The valve clack according to claim 3, wherein the central part is configured as a tip protruded upwards.

6. The valve clack according to claim 1, wherein the mounting column is configured to have a substantially triangular prism or cylindrical shape.

7. The valve clack according to claim 1, wherein adjacent ones of the plurality of blades are separated by a rib, an end of the rib is connected to the mounting column, a buffer structure is provided in a position where the blade is connected to the rib, and the buffer structure is configured to provide a buffer space for a deformation of the blade.

8. The valve clack according to claim 7, wherein the buffer structure is configured as a notch formed at a radial outer end of the blade and adjacent to the rib; or the buffer structure is configured as a film connected between the rib and the radial outer end of the blade.

9. The valve clack according to claim 7, wherein each of the plurality of blades has an arc-shaped edge.

10. An air pump, comprising:
an upper cover defining an air outlet;
a valve seat disposed at a bottom of the upper cover;
a spacer disposed between the valve seat and the upper cover and defining an air intake chamber and an air outtake chamber spaced apart from each other with the valve seat and the upper cover, the air intake chamber having an air intake passage communicated therewith, the air outtake chamber having an air outtake passage communicated therewith, the spacer having a valve clack, the valve clack comprising:
a mounting column having a plurality of air slots for dispersing an airflow at least in a top surface of the mounting column;
a plurality of blades arranged outside the mounting column in a circumferential direction of the mounting column, each blade having a radial inner end connected to the mounting column and elastically swingable with respect to the mounting column,
wherein each blade is elastically swingable with respect to the mounting column, so that air flows in a one-way direction upward;
an air intake one-way valve disposed and movable in the air intake passage so as to make the air flow in the one-way direction downward;
a piston assembly disposed under the valve seat.

11. The air pump according to claim 10, wherein the spacer further comprises a spacer body disposed around the valve clack and having an outer contour matching the bottom of the upper cover;
the spacer body defines a first air intake channel communicated with the air intake chamber, and a first air outtake channel communicated with the air outtake chamber is defined between an inner edge of the spacer body and a respective blade.

12. The air pump according to claim 11, wherein each blade has a thickness gradually decreased in a direction from the radial inner end of the blade to the radial outer end of the blade.

13. The air pump according to claim 11, wherein each blade has a lower surface in flush with a lower end surface of the spacer body, and an upper surface lower than an upper surface of the spacer body and gradually inclined in a direction from the radial inner end of each blade to the radial outer end of the blade.

14. The air pump according to claim 11, wherein the valve seat further defines a second air intake channel and a second air outtake channel, the air intake passage consists of the first air intake channel and the second air intake channel, the air outtake passage consists of the first air outtake channel and the second air outtake channel, wherein the air intake one-way valve is disposed at the second air intake channel.

15. The air pump according to claim 10, wherein the piston assembly comprises:
a piston diaphragm disposed under the valve seat and defining a plurality of air bags, each air bag being recessed downwards and defining a piston chamber therein;
a cylinder body disposed under the piston diaphragm, through which the air bag is passed;
a base seat disposed under the cylinder body;
a linkage mechanism disposed on the base seat and fitted with the plurality of air bags of the piston diaphragm;
a motor disposed under the base seat and having a driving shaft extended into the base seat to drive the linkage mechanism to actuate the plurality of air bags to move.

16. The air pump according to claim 15, wherein an air intake groove is formed in the base seat, a third air intake channel is defined between the cylinder body and a side wall of a top end of the piston diaphragm, a first air intake hole is formed in the valve seat, a second air intake hole communicated with the air intake chamber is formed in the spacer, wherein
the air intake groove is communicated with the first air intake hole via the third air intake channel, and the second air intake hole is corresponding to the first air intake hole in an up and down direction;

wherein each of a number of the blades of the valve clack, a number of the air intake one-way valves, a number of the air intake passages, a number of the third air intake channels, a number of the air outtake passages, a number of the first air intake holes and a number of the second air intake holes is the same as that of the air bags.

17. The air pump according to claim 15, wherein the upper cover defines an air inlet communicated with the air intake chamber;

wherein each of a number of the blades of the valve clack, a number of the air intake one-way valves, a number of the air intake passages and a number of the air outtake passages is the same as that of the air bags.

* * * * *